Jan. 5, 1960   L. THORINGTON   2,920,222
ELECTRIC LAMP

Filed Aug. 13, 1957   3 Sheets-Sheet 1

INVENTOR.
LUKE THORINGTON
BY
ATTORNEYS

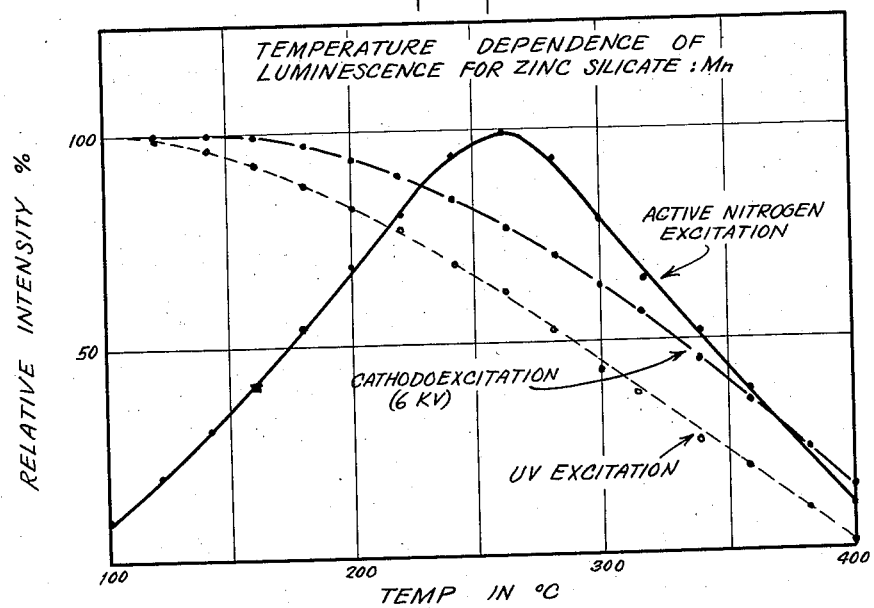
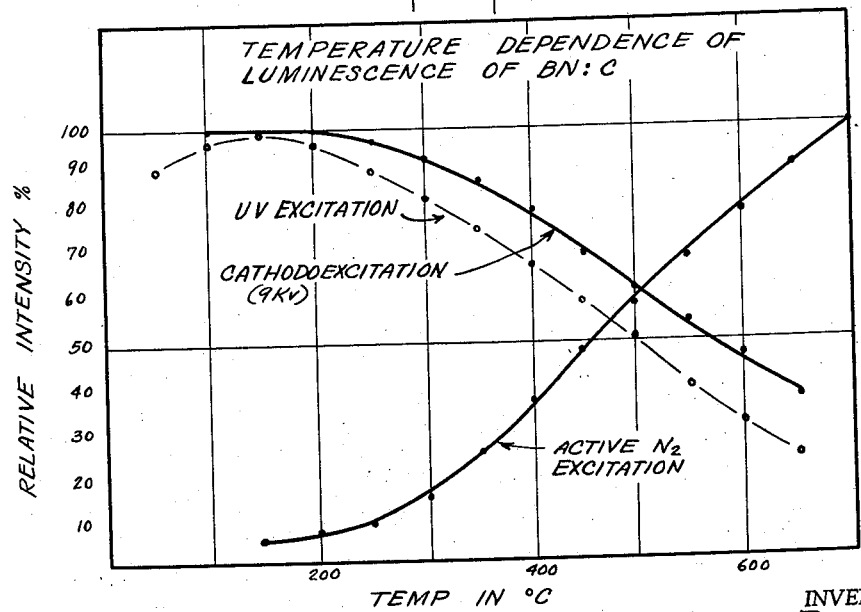

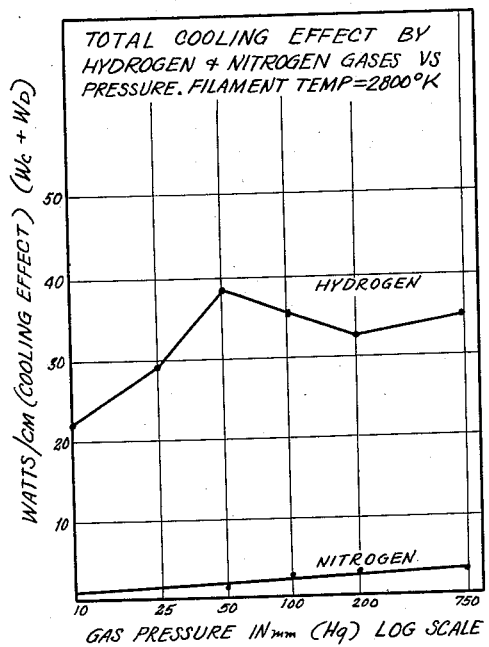
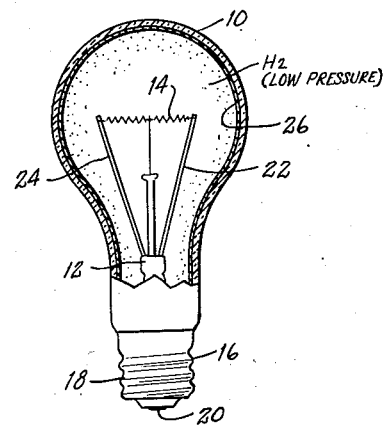
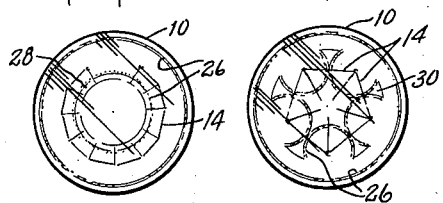
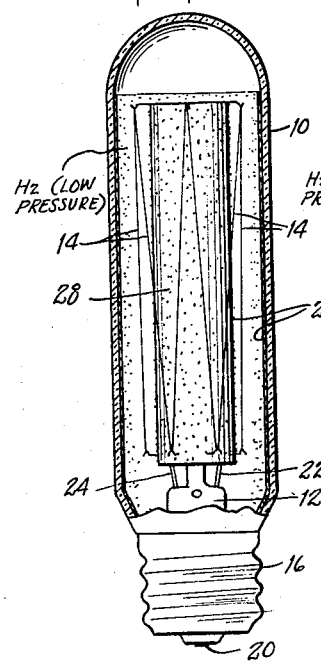
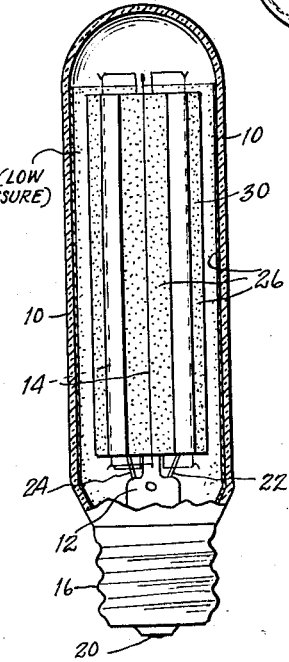
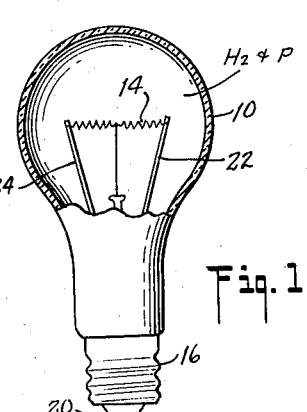

United States Patent Office 2,920,222
Patented Jan. 5, 1960

2,920,222
ELECTRIC LAMP

Luke Thorington, Berkeley Heights, N.J., assignor to Duro Test Corporation, North Bergen, N.J., a corporation of New York Application August 13, 1957, Serial No. 678,013

8 Claims. (Cl. 313—109)

This invention comprises a new source of light which generally speaking is an incandescent lamp producing light composed in part of the visible energy produced by an incandescent filament and the remainder from the illumination of active gas excitation of phosphors.

The nature of importance of the light source herein disclosed will stand out best against the following general background of lighting facts.

All artificial electric illuminants in use today fall into the classification consisting of incandescent, gas discharge, fluorescent, electroluminescent, and combinations of one or more of the above. Except for electroluminescent sources which as a practical matter are only of interest as a novelty, all these sources are widely used commercially throughout the world. As is of course well understood, of all these sources incandescent lamps are by far the most widely used. This results from the fact that at the beginning this type of light source had no real competition. To its advantage is the fact that it is extremely simple and requires no auxiliary devices in its operation. Furthermore, it is cheap and can be readily manufactured for operation over a wide range of voltage. Finally, its color rendition of the human skin is flattering.

The incandescent lamp has attained and continues to hold its outstanding position as a light source, surprisingly enough in spite of the fact that 90% of the input power is utterly wasted as far as useful illumination is concerned. It also has the important disadvantage that its color as distinguished from its color rendition can be varied in only the narrow range of about 2500 to 3000 degrees K. (color temperature) at anywhere near acceptable efficiency.

Broadly speaking the invention hereinafter disclosed involves improvements in incandescent lamps whereby these disadvantages are substantially overcome without sacrifice of any of its other advantages. A brief review of the present day incandescent lamp will be helpful in evaluating these improvements as will some consideration of various other attempts and proposals made to date for improving incandescent lamp efficiency and color.

Of the input power which may be considered as wasted from the operation of an incandescent lamp, the following classification indicates its components:

|  | Parts |
|---|---|
| (1) Emitted as infra red radiation | 72.0 |
| (2) Gas loss | 11.5 |
| (3) Absorption by bulb and base | 5.2 |
| (4) Lead and support loss | 1.3 |
| Total | 90.0 |

The production of visible radiation by an incandescent lamp is greatly increased by raising the temperature of the filament, as can be established by well known laws, but of course, as a result the useful life of the lamp is short. For example, the temperature of a 100 watt lamp filament is adjusted to about 2850° K. for a life of about 750 hours and an intial efficiency of 16.3 lumens per watt (l./w.). If the temperature of the filament is adjucted to approximately the melting point of tungsten (3643° K.) theoretically one would attain 52 l./w., but the life of the filament will be only a fraction of a second. This example serves as a reminder of the interdependence of filament temperature and life of an incandescent lamp. As is well know in the art, this method of increasing lamp efficiency has been greatly studied and as a result at the present time incandescent lamps are adjusted to operate at the optimum light efficiency for design life and no further improvement in this respect can be anticipated.

It has been been proposed to utilize the normally wasted infra red energy by the use of a selective infra red reflector such as titanium dioxide coated on both sides of a spherical bulb in which a specially wound compact filament is accurately positioned at the center. This results in an increase of efficiency of about 11%. This coating reflects the normally wasted infra red energy back onto the filament while visible radiation is allowed to pass through the coated bulb wall. As a result of this type of operation less input power is required to maintain the filament at a given temperature of operation. The cost of making such a lamp, however, appears to be prohibitive when related to the relatively small gain in lighting efficiency that is attained.

The power loss due to conduction and convection of heat from the filament by the fill-gas is related directly to the thermal conductivity of the gases within the bulb. At the present time the most common fill-gas for incandescent lamps consists of various mixtures of nitrogen and argon. As is well understood by those skilled in the art the thermal conductivity of the following gases decreases in the order listed, viz. $H_2$, $N_2$, Ne, Ar, Kr, Xe. Unfortunately the rareness of these gases increases in the same order. If krypton were used in place of argon the efficiency of an incandescent lamp would increase by about 20%. However, even with a gain as great as this the cost of substituting krypton for argon is prohibitive at the present time. A slight gain in efficiency can also be attained by increasing the fill-gas pressure in spite of the fact that the power loss due to the presence of the gas would also be increased. This results from the fact that the filament temperature can be increased slightly at higher gas pressures without increasing the rate of tungsten evaporation. A reduction in the overall surface area of the filament also reduces the gas loss which is why the industry has gone to coiling, double coiling and the like, but this source of improvement has apparently been exploited to the fullest in present day commercial incandescent lamps.

Losses of power due to absorption by the bulb and base and to conduction by leads and supports together account for about 6.5% of the total power input and there seems to be no way to materially reduce these losses. Some attempts have been made in this respect but the results attained are not of major importance. Thus it will be seen from the above general description that even disregarding cost and following known procedures it cannot be expected that the maximum improvement in the efficiency of incandescent lamps over the standard present day commercial product will be much more than 30-35%. Several more radical proposals for improving the efficiency of incandescent lamps are now current. Broadly speaking these proposals make use of the following properties of hot tungsten wire:

(1) The steep positive resistance-temperature characteristic.
(2) The thermionic emission.
(3) The near ultraviolet and blue radiation emission.

The first property is employed in a known combination discharge-incandescent lamp in which the filament acts simultaneously as a current limiting device for the discharge and as a source of red-rich radiation. In this combination the discharge source usually supplies most of the illumination and it can hardly be proper to say, therefore, that this lamp is an improved incandescent lamp. However, it has certain useful properties desired by an improved incandescent lamp, as for example higher efficiency (up to about 30 l./w.), wider color variation and the ability to operate without auxiliary devices. Unfortunately, its cost is relatively high and it has the undesirable property of not starting immediately after power interruption.

Utilization of the normally wasted thermionic emission of a hot tungsten filament to excite cathodo-luminescence in a special bulb coating has been suggested. Unfortunately a successful lamp of this type awaits development of satisfactory coatings which are sufficiently responsive to the very low accelerating voltages available, without transformation. In its simplest form this lamp is an ordinary incandescent lamp with a phosphor coating deposited over a transparent electrically conducting coating on the inner surface of the bulb. The conducting coating is connected electrically either to the midpoint of the filament or to one side of the line. In the latter case luminescence is obtained on alternate half cycles at full line voltage while in the former case luminescence occurs on consecutive half cycles but at half line voltage. Although the theoretical efficiency of this lamp is fairly high (about 30-40 l./w.) so would be the cost involved in applying the additional coating and connections, the latter of which are difficult to make.

Although only a relatively small amount of ultraviolet radiation is produced by an ordinary incandescent lamp it is still sufficient to effect some improvement in efficiency if it is utilized by the proper phosphor coating. The gain for an ordinary 100 w. lamp with such a coating would be only about 3% but this is attained without changing the basic lamp design and hence without greatly increasing cost. If maximum efficiency gain without regard for color is desired, it is possible to attain a 20% improvement by utilizing all the radiation below about 5200 A. and converting it into narrow band luminescence emission peaked at 5550 A. This would be a worthwhile improvement but that too awaits the development of a suitable phosphor powder. In addition from the standpoint of color such a light source would be undesirable for general illumination since it is totally deficient in blue and violet radiation.

An ideal solution of this problem would be one involving a coating for transforming the infra red radiation into visible radiation. This phenomenon has not heretofore been observed but its possibility on fundamental grounds is recognized. Broadly speaking it would amount to stepwise excitation of a phosphor by several infra red quanta with subsequent emission of a single higher energy (visible) quantum. It is through this approach that substantial efficient improvement in the ordinary tungsten lamp would be desirable, given the secret to effect it. Stated another way, an ideal source of improvement of the tungsten lamp as it is known commercially today would be to convert the heat into light by a process more efficient than simple incandescence of the tungsten. This solution has long been desired and it is disclosed below.

In accordance with this invention use is made of two phenomena, the first is the phenomenon of dissociation of hydrogen molecules into atoms in the presence of a hot tungsten wire which catalyzes this dissociation. The other is the phenomenon of excitation of certain phosphors by "active" (dissociated) gases. In accordance with this invention these two phenomena are utilized in a combination which is structurally simple and inexpensive to manufacture. This combination is basically that of the present day commercial incandescent lamp modified to utilize these two phenomena to greatly improve the efficiency of an incandescent lamp.

With respect to the first phenomenon let us assume an incandescent lamp to be filled with hydrogen gas instead of nitrogen or argon or mixtures thereof. In order to maintain the normal operating temperature of the filament additional power would have to be supplied to the lamp because of the increased cooling effect due to the presence of hydrogen. The cooling effect of this fill-gas follows the generally relation, up to a temperature of about 1900° K.

$$W_c = S \int_{T_1}^{T_2} k dT \qquad (1)$$

where $W_c$ = power carried by ordinary heat conduction and convection
$S$ = "shape factor" and depends on the diameter of the wire and the nature of the gas and
$K$ = coefficient of heat conductivity of the gas.

Above this temperature $W_c$ for hydrogen may be as high as twenty times that predicted by Equation 1 while all other gases follow the relation quite closely.

A comparison between $W_c$ for nitrogen and hydrogen at a pressure of 50 mm. (Hg) and at various temperatures is shown in Fig. 1. Other gases such as argon, krypton, etc. which show a similar curve to that of nitrogen but slightly below the latter because of the lower thermal conductivity of these heavier gases.

At this point it may be noted that in the accompanying drawings:

Figures 1, 2, 3, 4 and 5 comprise charts showing the relationship between various indicated factors as coordinates as appears therein respectively;

Figure 6 is an elevational view of an incandescent lamp in accordance with this invention, showing the envelope in cross-section;

Figures 7 and 9 are elevational views showing the envelope in cross-section of other forms of lamp in accordance with this invention;

Figures 8 and 10 respectively are top plan views of the lamps of Figs. 7 and 9; and Figure 11 is an elevational view of still another form of lamp in accordance with this invention showing the envelope in cross-section.

This peculiar behavior of hydrogen is due to the catalytic dissociation of hydrogen molecules into atoms by the hot tungsten wire. The mathematical relation which describes the cooling effect of this particular gas is:

$$W = W_c + W_d \qquad (2)$$

where $W$ = total power carried by hydrogen gas
$W_c$ = power carried by ordinary conduction
$W_d$ = power carried by dissociation of hydrogen.

Figure 2:
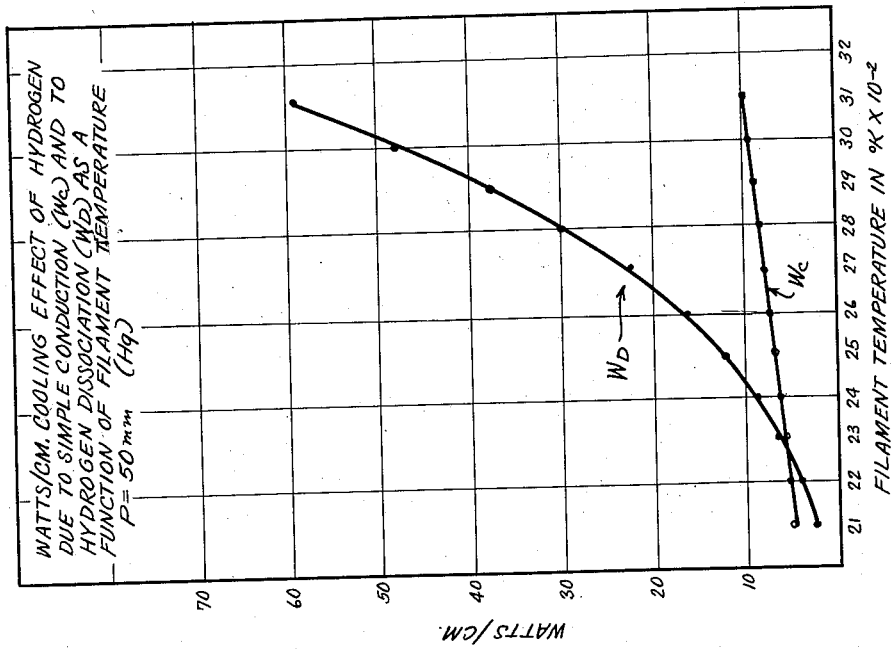
Figure 1:
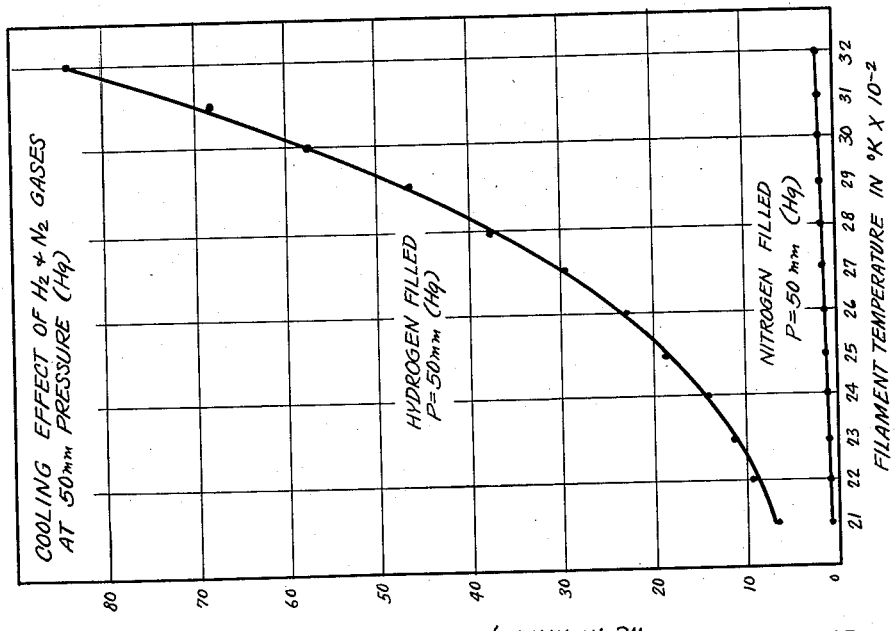

The magnitude of $W_d$ is seen from Fig. 2 to be considerably greater at temperatures above 2200° K. than $W_c$ for a total gas pressure of 50 mm. (Hg). The relation between pressure and $W$ is shown in Fig. 3 for hydrogen and nitrogen for a filament temperature of 2800° K. From this figure appears the startling fact that the total cooling effect ($W_c + W_d$) of hydrogen gas actually increases with decreasing pressure, contrary to what might be expected and which is true of nitrogen. The answer to this startling increase is found in the fact that the degree of dissociation of hydrogen increases with decreasing pressure so more and more power is carried by this means until the effect of actual reduction of the number of hydrogen molecules present begins to outweigh the increase in degree of dissociation.

In the light of these observations and other evidence which could be presented it can be deduced that hydrogen molecules are in fact dissociated into atoms by a hot tungsten filament. This is so in spite of the fact that the energy necessary to tear apart the molecule is very large, viz. about 4.5 electron volts. This compares with the energy of the 2537 A. quantum (about 5 e.v.) which is the predominant radiation from the low pressure mercury discharge which excites the phosphor coating in fluorescent lamps.

Once the molecule is dissociated the constituent atoms will remain free until collision with other similar atoms occurs, whereupon recombination takes place with subsequent release of the tremendous energy originally required to separate them. This distance, the mean free path, traveled by hydrogen atoms before collision is effectively increased by a factor of 4.2 over that for hydrogen molecules because of the apparent ability of hydrogen atoms to displace a hydrogen atom from a hydrogen molecule with which the former has collided, thus liberating another atom of the latter. The "effective" mean free path of hydrogen atoms is about 5.5 cm. at a hydrogen pressure of 0.015 mm. (Hg) and about 0.168 cm. at a pressure of 4.4 mm.

Ordinarily energy released when hydrogen atoms react to form molecules is in the form of heat. A commercial example of the use of this phenomenon is indicated in the principle of operation of the atomic hydrogen torch. In this torch a stream of hydrogen gas is passed through a high voltage discharge between tungsten electrodes where it is decomposed into hydrogen atoms which subsequently recombine on the surfaces to be heated releasing to it the energy of recombination as heat. As will be explained below the energy liberated upon recombination of hydrogen atoms can be converted into light.

Phosphors are best known in the lamp industry for their ability to reconvert ultraviolet radiation into light. Such materials can be excited in a number of other ways, as for example by electrons, ions, electric field, X-rays, alpha particles, etc. In accordance with this invention and as has been observed as a separate phenomenon, certain materials are excited to produce visible light in the hydrogen flame. For example, magnesium aluminate: Mn emits a brilliant green luminescence when a hydrogen flame is played over its surface. This luminescence occurs at the boundary between the flame and the atmosphere. Zinc oxide and zinc sulfide: Cu phosphors also exhibit the same phenomenon. This emission is not a momentary thermoluminescence which would require a preexcitation by ultraviolet or electrons but continues as long as the flame is applied.

Luminescence is also excited in phosphors when they are exposed to "active" (dissociated) gases such as nitrogen and hydrogen. Many phosphors including the oxides of Be, Mg, Ca, Zn, Sr, Cd, Ba, and the sulfides of Cu, Zn, Sr, Ba, B, Al, Ga and Ce show the phenomenon. These in some cases may contain Mn, Bi, Ag, and Y as activators. Zinc silicate: Mn and boron nitride: C also show the phenomenon as well as a number of organic phosphors.

Of special interest are data showing the temperature dependence of luminescence for excitation by active nitrogen as compared with that for photo- and cathodoexcitation. It is known that active hydrogen shows the same results but experimental difficulties are greater than with active nitrogen. Curves for zinc silicate: Mn and boron nitride: C are reproduced in Figs. 4 and 5. As a scientific fact it is especially fortuitous that active gas excitation is in general a high temperature phenomenon, since high temperature operation is an inherent property of the incandescent lamp.

There will now be described the manner in which, in accordance with this invention, the efficiency of an incandescent lamp may be greatly improved. An example of the lamp is illustrated somewhat diagrammatically in Fig. 6. Basically it is of the usual construction, comprising a sealed glass envelope 10 of suitable configuration having a re-entrant stem 12 on which is supported, in accordance with any suitable construction, a tungsten filament 14. Applied to the neck of the bulb is the usual base 16, consisting of a thread forming shell 18 and an insulated center contact 20. The shell and contact are respectively connected to the ends of the filament by the leads 22 and 24.

The bulb 10 is coated on its inner surface with a coating 26 of any single one or a mixture of two or more of the phosphors listed above, as showing the phenomenon discussed in connection therewith. They might, as there stated, contain an activator. For example, this coating may consist of zinc silicate: Mn. The coating can be applied in any number of different ways suitable to the purpose, as for example by the methods which are now used for coating incandescent lamp bulbs and fluorescent tubes. The thinness of the coating is not critical but obviously it is preferable that it be made as thin as possible, consistent with the objects of this invention in order to make the coated wall an efficient light transmitter. By way of example, the coating may be of a thickness comparable to that commonly used in fluorescent lamps and may be as thin as or thinner than the silica coating now used on white bulb incandescent lamps.

Further in accordance with this invention, the coated envelope is highly evacuated in the same way as it is in the manufacture of ordinary incandescent lamps and hydrogen is introduced at relatively low pressures as explained below, and the bulb sealed. Of course, other processes used in the manufacture of incandescent lamps to increase their light efficiency may also be used.

From the above it will be seen that strickly speaking the changes required in a standard incandescent lamp to incorporate subject matter of this invention are relatively simple and inexpensive. Also, these changes do not alter the appearance in any substantial manner of the lamp nor change the conditions of its use.

For operation power is applied to the filament in the normal way to maintain it at the desired operating temperature. Hydrogen molecules impinging on the hot filament are absorbed and dissociated into atoms and subsequently are emitted from the filament. At sufficiently low pressures the atoms travel unimpeded until they strike the coating on the bulb wall, whereupon they recombine on the surface of the coating to form molecules again with the release of energy to the coating. This coating converts this energy into visible light and the hydrogen molecules thus formed desorb and eventually return to the hot filament to begin another cycle.

Assuming a filament temperature of 2500° K. it is possible to determine, as will be explained below, the optimum hydrogen pressure of the gas-fill. If the lamp were operated at higher temperatures appreciably higher hydrogen pressures would be required to retard filament evaporation and this would result in too high a value for $W_c$, the power conducted away by the gas. The relation at various pressures of gas between watts/cm. radiated ($W_R$), watts/cm. carried by the gas $$(W=W_c+W_D)$$

total watts/cm., watts/cm. due to dissociation of hydrogen ($W_D$) lumens/cm. radiated, theoretical lumens/cm. obtainable from $W_D$, and finally efficiency in lumens per watt, have been set forth in Table I.

TABLE I

*Wattage, lumen and efficiency relations for tungsten wire in various pressures of hydrogen gas*

| $H_2$ Press., mm. | $W_R$ | W | $W_R+W$ | $W_D$ | $Lf$ | $L_D$ | $Lt$ | L/W |
|---|---|---|---|---|---|---|---|---|
| .015 | 1.82 | .178 | 2.00 | .169 | 18.2 | 16.9 | 35.1 | 17.5 |
| .039 | 1.82 | .42 | 2.24 | .40 | 18.2 | 40 | 58.2 | 26.0 |
| .207 | 1.82 | 1.58 | 3.40 | 1.48 | 18.2 | 148 | 166.2 | 48.9 |
| 1.10 | 1.82 | 4.85 | 6.67 | 4.19 | 18.2 | 419 | 437 | 65.5 |
| 4.4 | 1.82 | 8.21 | 10.03 | 7.1 | 18.2 | 710 | 728 | 72.8 |
| 10 | 1.92 | 10.2 | 12.1 | 7.8 | 19.2 | 780 | 799 | 66.1 |
| 25 | 1.92 | 14.5 | 16.4 | 9.9 | 19.2 | 990 | 1009 | 61.5 |
| 50 | 1.92 | 19.0 | 20.9 | 12.5 | 19.2 | 1,250 | 1,269 | 60.6 |
| 100 | 1.92 | 17.8 | 19.7 | 9.4 | 19.2 | 940 | 959 | 48.6 |

$W_R$ = watts/cm. radiated by wire.
W = watts/cm. cooling by hydrogen ($W_c+W_d$).
$W_R+W$ = watts/cm. total supplied to filament.
$W_D$ = watts/cm. to hydrogen dissociation.
$Lf$ = lumens/cm. radiated from filament at 2500° K.
$L_D$ = lumens/cm. theoretically attainable from dissociation of hydrogen and recombination on optimum green phosphor.
$Lt$ = lumens/cm. total.
L/W = lumens/watt efficiency (theoretical).
Wire diameter = .00706 cm. = .00278 inch.

As noted in the table above tabulation is per centimeter of wire of diameter 2.78 mils. The efficiency of the filament at 2500° K. has been taken to be 10 l./w. and the theoretical efficiency for conversion of $W_D$ to light is taken to be 100 l./w. The latter is a reasonably accurate theoretical figure for a narrow band green luminescing phosphor peaking at 5550 A. Actually if one assumed 100% energy conversion efficiency of $W_D$ into a luminescence spectrum having a luminosity factor of 0.9, then a maximum luminous efficiency of about 600 l./w. would be obtained. This of course could never be attained because of quantum considerations.

It is apparent from Table I that optimum lamp efficiency will be obtained at a hydrogen gas-fill pressure approximately 4.4 mm. (Hg). At this pressure the mean free path of hydrogen atoms in hydrogen is very small as seen from Table II.

TABLE II

*Effective mean-free-path of hydrogen atoms at various pressures*

| Pressure in mm. (Hg) | Effective Mean-Free-Path (cm.) |
|---|---|
| 0.015 | 5.46 |
| .039 | 2.1 |
| .207 | .42 |
| 1.1 | .0756 |
| 4.4 | .0168 |
| 10 | ------ |
| 25 | ------ |

The significance of this is that some of the hydrogen atoms would recombine to form molecules before reaching the coating and bulb wall and this, of course, would result in a corresponding loss in light efficiency. The best pressure for the hydrogen gas-fill is about 0.2 mm. where the filament-coating distance is of the order of 0.4 cm. and with this combination the light efficiency attainable is approximately 50 l./w.

Such a dimension suggests a lamp of cylindrical design with an axial filament as the best compromise, although as suggested above the subject matter of this invention will produce useful results employing the usual incandescent lamp geometry.

With regard to the filament it is best that it have as great a surface area as possible. In other words a straight filament. As a practical matter this is an interesting contrast with the tendency today in incandescent lamps of reducing the area of the filament by using single, double and triple coils for the purpose of reducing the gas loss. Thus the filament construction is simplified in the combination of this invention.

It is important to note that the lamp of this invention does not require the use of subtractive filters to obtain variation in color and color rendition of the source. Color choice is as simple as in the case of fluorescent lamps where by the selection of the proper coating from the viewpoint of light emitted a wide range of resultant light with respect to color is attainable.

Another advantage of the lamp of this invention is that the light therefrom is inherently rich in red and deep red radiations, a color difficult to obtain with fluorescent lamps.

The lamp of Figure 6, as described above, illustrates how a useful light source in accordance with this invention can be made with substantially no changes in the construction of the ordinary incandescent lamp. However, as is apparent from the foregoing description, this physical form of lamp is not as efficient a production of the subject matter of this invention as is possible. A more efficient form of lamp is one in which the tungsten filament to phosphor spacing is such that maximum bombardment by hydrogen atoms occurs. This spacing is determined in part by the pressure of the hydrogen fill for the envelope. That is the spacing may be greater the lower the pressure of the hydrogen fill. It is also important that the temperature of the phosphor be maintained sufficiently high so that desorption of the hydrogen gas takes place readily. Naturally the temperature of the phosphor will in part be determined by its distance from the hot tungsten filament. This temperature maintenance is necessary otherwise a layer of hydrogen may build up on the phosphor surface and render it inactive. As appears from the above, the temperature of the phosphor should correspond to the temperature of peak excitation by active gases, as for example the hydrogen, and of course will vary, depending upon which phosphor or mixtures thereof are used, as will be well understood by those skilled in this art.

For these among other reasons a lamp having a cylindrical envelope provides a more efficient geometry than that of the present standard incandescent lamp, as diagrammatically illustrated in Figure 6. Referring, therefore, to Figure 7, there is shown an incandescent lamp having a cylindrical envelope. In this figure the same reference numeral has been applied to the corresponding element of the lamp of Figure 6. It is noted, however, that in this form of lamp the envelope 10 is of cylindrical form and a glass tubular support 28 is mounted on the stem tube 12 by means of which the filament 14 is supported by wire hooks in a manner known in the art. With this arrangement the tungsten filament 14 extends back and forth between the hooks which are mounted in the tube 28 to physically distribute the filament on a substantially cylindrical path about the support 28, as is clear from Figure 8. By adjusting the dimensions of this structure it will be seen that the various legs of the filament 14 will extend more or less parallel to the phosphor coating 26 on the inner surface of the bulb 10 and can be properly spaced in accordance with the above consideration. The light efficiency of this lamp can further be increased by applying to the outer surface of the tubular insulating support 28 a similar coating 26, of phosphor, as indicated in these figures.

Figures 9 and 10 diagrammatically illustrate still another form of lamp in accordance with this invention wherein the above mentioned factors are taken into account. In this arrangement there is mounted on the stem tube 12 an insulating support 30 which, as illustrated in Figure 10, forms a series of semi-cylindrical chambers in which the various legs of the filament 14 are respectively mounted more or less at their centers. The semicircular walls of these cavities can also be coated with the phosphor coating 26, as diagrammatically illustrated, so as to be similar in this respect to the lamp of Figure 7. The parts of this lamp of Figure 9 can be dimensioned to provide for the most efficient spacing of the coatings and hot tungsten filament legs. These cylindrical forms of lamp are subject to geometrical design adjustments which make them more efficient for the purposes of this invention than the modified standard lamp of Figure 6.

There is diagrammatically illustrated in Figure 11 another lamp in accordance with this invention in which instead of using a phosphor coating a gas or vapor atmosphere is suggested and is mixed with the hydrogen atmosphere. This lamp operates in accordance with the basic principle described above, but the recombination of the hydrogen atoms takes place in contact with the gas or vapor mixed therewith to convert the energy of recombination into visible light. In this lamp phosphorus, for example, can be used in place of the phosphor coating. By way of clarifying the action of the phosphorus the following equations may be helpful:

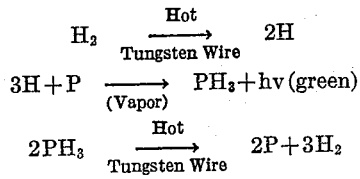

These equations are not intended to convey the exact mechanism of the reaction of phosphorus and hydrogen atoms but only to indicate a possible explanation. As is clear from these equations the phosphorus is not used up in this reaction but recycles so long as the tungsten filament operates at a sufficiently high temperature, as for example about 2500° K.

From the above description it will be apparent to those skilled in the art that the subject matter of his invention is capable of taking various useful forms, and it is preferred, therefore, that this disclosure be taken in an exemplary sense and the scope of protection afforded be determined by the appended claims.

What is claimed is:

1. A light source comprising an evacuated light transmitting envelope, an incandescible tungsten source of radiant energy in said envelope, a gas or vapor in said envelope at or below a pressure of 200 millimeters which dissociates in the presence of hot tungsten, and another substance in said envelope which converts the heat of recombination of the dissociated gas or vapor into visible light.

2. A light source comprising an evacuated light transmitting envelope, an incandescible tungsten source of radiant energy in said envelope, hydrogen in said envelope at or below a pressure of 200 millimeters which dissociates in the presence of hot tungsten, and another substance in said envelope which converts the heat of recombination of the dissociated hydrogen into visible light.

3. A light source comprising an evacuated light transmitting envelope, an incandescible tungsten source of radiant energy in said envelope, a gas or vapor in said envelope at or below a pressure of 200 millimeters which dissociates in the presence of hot tungsten, and a phosphor in said envelope which converts the heat of recombination of the dissociated gas or vapor into visible light.

4. A light source comprising an evacuated light transmitting envelope, an incandescible tungsten source of radiant energy in said envelope, hydrogen in said envelope at or below a pressure of 200 millimeters which dissociates in the presence of hot tungsten, and a phosphor in said envelope which converts the heat of recombination of the dissociated gas or vapor into visible light.

5. A light source comprising an evacuated light transmitting envelope, an incandescible tungsten source of radiant energy in said envelope, a gas or vapor in said envelope which dissociates in the presence of hot tungsten, and a gas or vapor in said envelope which converts the heat of recombination of the dissociated gas or vapor into visible light.

6. A light source comprising an evacuated light transmitting envelope, an incandescible tungsten source of radiant energy in said envelope, hydrogen in said envelope which dissociates in the presence of hot tungsten, and a gas or vapor in said envelope which converts the heat of recombination of the dissociated hydrogen into visible light.

7. A light source comprising an evacuated light transmitting envelope, an incandescible tungsten source of radiant energy in said envelope, a gas or vapor in said envelope which dissociates in the presence of hot tungsten, and phosphorous vapor in said envelope which converts the heat of recombination of the dissociated gas or vapor into visible light.

8. A light source comprising an evacuated light transmitting envelope, an incandescible tungsten source of radiant energy in said envelope, hydrogen in said envelope which dissociates in the presence of hot tungsten, and phosphorous vapor in said envelope which converts the heat of recombination of the dissociated hydrogen into visible light.

References Cited in the file of this patent

UNITED STATES PATENTS

| | | |
|---|---|---|
| 1,186,993 | Keyes | June 13, 1916 |
| 1,249,978 | MacKay | Dec. 11, 1917 |
| 1,463,178 | Shackelford | July 31, 1923 |
| 1,572,607 | Jenkins | Feb. 9, 1926 |
| 1,572,670 | Myers | Feb. 9, 1926 |
| 2,114,175 | Cartun | Apr. 12, 1938 |
| 2,221,644 | Lucian | Nov. 12, 1940 |
| 2,748,303 | Thorington | May 29, 1956 |
| 2,759,119 | Thorington | Aug. 14, 1956 |